United States Patent
Zhang (10) Patent No.: US 11,019,012 B2
(45) Date of Patent: May 25, 2021

(54) FILE SENDING IN INSTANT MESSAGING APPLICATION

(71) Applicant: BEIJING SANKUAI ONLINE TECHNOLOGY CO., LTD, Beijing (CN)

(72) Inventor: Dongyuan Zhang, Beijing (CN)

(73) Assignee: BEIJING SANKUAI ONLINE TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 16/674,567

(22) Filed: Nov. 5, 2019

(65) Prior Publication Data

US 2020/0067860 A1    Feb. 27, 2020

Related U.S. Application Data

(63) Continuation-in-part of application No. PCT/CN2017/114631, filed on Dec. 5, 2017.

(30) Foreign Application Priority Data

May 8, 2017    (CN) .......................... 201710318822.8

(51) Int. Cl.
    *G06F 15/16*    (2006.01)
    *H04L 12/58*    (2006.01)
    *H04L 29/08*    (2006.01)

(52) U.S. Cl.
    CPC .............. *H04L 51/10* (2013.01); *H04L 51/04* (2013.01); *H04L 67/06* (2013.01)

(58) Field of Classification Search
    CPC ......... H04L 51/10; H04L 51/04; H04L 67/06; H04L 51/18
    See application file for complete search history.

(56) References Cited

U.S. PATENT DOCUMENTS

| 5,809,244 | A  | * | 9/1998 | Asai ........................ | G06F 16/40 |
|           |    |   |        |                               | 709/217    |
| 7,200,590 | B2 | * | 4/2007 | Everett-Church ...... | H04L 51/04 |
|           |    |   |        |                               | 709/203    |

(Continued)

FOREIGN PATENT DOCUMENTS

| CM | 106547868 A | 3/2017 |
| CN | 101098310 A | 1/2008 |

(Continued)

OTHER PUBLICATIONS

Feb. 28, 2018, International Search Report, State Intellectual Property Office of the P.R. China in PCT/CN2017/114631, to which this application claims priority.

(Continued)

*Primary Examiner* — Jonathan A Bui (74) *Attorney, Agent, or Firm* — Kolitch Romano LLP (57) ABSTRACT

A file sending method in an instant messaging application is disclosed. According to an example of the file sending method, an electronic device may obtain file information included in a session message edited in a session interface of an instant messaging application, and obtain candidate files according to the file information. The electronic device may present at least some of the candidate files, determine a file selected by a user according to a selection operation performed by the user on the presented candidate files, and send the file selected by the user.

13 Claims, 6 Drawing Sheets

(56) References Cited

U.S. PATENT DOCUMENTS

| | | | |
|---|---|---|---|
| 8,832,201 B2* | 9/2014 | Wall | H04L 51/046 |
| | | | 709/206 |
| 9,888,016 B1* | 2/2018 | Amin | H04L 63/1483 |
| 2003/0135571 A1* | 7/2003 | Sato | H04L 51/18 |
| | | | 709/206 |
| 2006/0279771 A1* | 12/2006 | Ludwig | G06F 21/608 |
| | | | 358/1.15 |
| 2010/0159883 A1 | 6/2010 | Pascal et al. | |
| 2013/0059578 A1* | 3/2013 | Finberg | H04L 12/6418 |
| | | | 455/425 |
| 2013/0073640 A1 | 3/2013 | Liao et al. | |
| 2014/0324992 A1 | 10/2014 | Zhang et al. | |
| 2015/0264442 A1* | 9/2015 | Fujimoto | H04N 9/87 |
| | | | 386/230 |
| 2016/0034440 A1* | 2/2016 | Lee | G06F 3/14 |
| | | | 715/728 |
| 2016/0291822 A1* | 10/2016 | Ahuja | H04L 51/10 |
| 2017/0104703 A1* | 4/2017 | Yoo | H04L 65/1083 |
| 2017/0310789 A1* | 10/2017 | Thomee | H04L 67/327 |
| 2018/0144309 A1* | 5/2018 | Rolle | G06Q 10/1097 |
| 2018/0157408 A1* | 6/2018 | Yu | G06F 3/0483 |
| 2018/0295072 A1* | 10/2018 | Yim | G06F 3/04817 |
| 2019/0303488 A1* | 10/2019 | Kubota | G06F 16/258 |

FOREIGN PATENT DOCUMENTS

| | | | |
|---|---|---|---|
| CN | 101114979 A | 1/2008 |
| CN | 102651716 A | 8/2012 |
| CN | 102664831 A | 9/2012 |
| CN | 103810285 A | 5/2014 |
| CN | 104252508 A | 12/2014 |
| CN | 104331440 A | 2/2015 |
| CN | 106446096 A | 2/2017 |
| CN | 107086953 A | 8/2017 |
| EP | 1763187 A1 | 3/2007 |

OTHER PUBLICATIONS

Jun. 4, 2018, The State Intellectual Property Office of People's Republic of China, First Office Action of Chinese Application No. 201710318822.8, which is a foreign counterpart application corresponding to this U.S. Patent Application, to which this application claims priority.

Sep. 3, 2018, The State Intellectual Property Office of People's Republic of China, Second Office Action of Chinese application No. 201710318822.8, which is a foreign counterpart application corresponding to this U.S. Patent Application, to which this application claims priority.

European Patent Office, Extended European Search Report pursuant to Rule 62 EPC, dated Dec. 22, 2020 in EP application No. 17908893.5.

* cited by examiner

FILE SENDING IN INSTANT MESSAGING APPLICATION

CROSS-REFERENCES

This patent application is a continuation-in-part of International Application No. PCT/CN2017/114631, filed on May 12, 2017, and entitled FILE SENDING IN INSTANT MESSAGING APPLICATION. This international application claims priority to the Chinese patent application No. 201710318822.8, filed on May 8, 2017, and entitled FILE SENDING METHOD AND APPARATUS IN INSTANT MESSAGING APPLICATION AND ELECTRONIC DEVICE. Both of these applications are hereby incorporated herein by reference in their entireties.

FIELD

This disclosure relates to systems and methods for sending files in an instant messaging application, as well as related devices.

INTRODUCTION

In an instant messaging application, before sending a file to another session object in a current session, a session object needs to first click a file sending icon that is set in a session interface. Subsequently, the instant messaging application invokes a file browser, and the session object manually opens local folders level by level, browses file names, and finally selects the to-be-sent file.

Because a user needs to manually open folders level by level, and manually searches for a to-be-sent file level by level based on directories, file sending efficiency is relatively low.

SUMMARY

In view of this, according to a first aspect of this application, a file sending method in an instant messaging application is provided. The method may include: obtaining, by an electronic device, file information included in a session message edited in a session interface of the instant messaging application; obtaining, by the electronic device, candidate files according to the file information; presenting, by the electronic device, at least some of the candidate files; and determining, by the electronic device, a file selected by a user according to a selection operation performed by the user on the presented candidate files, and sending the file selected by the user.

According to a second aspect of this application, a file sending apparatus in an electronic device is provided. The apparatus may include: a file information obtaining module, configured to obtain file information included in a session message edited in a session interface of the instant messaging application; a candidate file obtaining module, configured to obtain candidate files according to the file information; a candidate file presentation module, configured to present at least some of the candidate files; and a file sending module, configured to: determine a file selected by a user according to a selection operation performed by the user on the presented candidate files, and send the file selected by the user.

According to a third aspect of this application, a file sending method in an instant messaging application is provided. The method may include: receiving, by a server, a file search request sent by an electronic device, where the file search request includes file information; searching for, by the server, candidate files matching the file information; and sending, by the server, the candidate files to the electronic device, to present at least some of the candidate files on the electronic device.

According to a fourth aspect of this application, a file sending apparatus in a server is provided. The apparatus may include: a file search request receiving module, configured to receive a file search request sent by an electronic device, where the file search request includes file information; and a searching and sending module, configured to search for candidate files matching the file information, and send the candidate files to the electronic device, to present at least some of the candidate files on the electronic device.

According to a fifth aspect of this application, an electronic device is disclosed, including a memory, a processor, and a computer program stored in the memory and executable by the processor, where when executing the computer program, the processor implements the following operations: obtaining file information included in a session message edited in a session interface of an instant messaging application; obtaining candidate files according to the file information; presenting at least some of the candidate files; and determining a file selected by a user according to a selection operation performed by the user on the presented candidate files, and sending the file selected by the user.

According to a sixth aspect of this application, a computer-readable storage medium is provided, storing a computer program, where when executed by a processor, the program implements the steps of the foregoing file sending method in an instant messaging application.

According to a seventh aspect of this application, a server is disclosed, including a memory, a processor, and a computer program stored in the memory and executable by the processor, where when executing the computer program, the processor implements the following operations: receiving a file search request sent by an electronic device, where the file search request includes file information; searching for candidate files matching the file information; and sending the candidate files to the electronic device, to present at least some of the candidate files on the electronic device.

According to an eighth aspect of this application, a computer-readable storage medium is provided, storing a computer program, where when executed by a processor, the program implements the steps of the foregoing file sending method in an instant messaging application.

Features, functions, and advantages may be achieved independently in various embodiments of the present disclosure, or may be combined in yet other embodiments, further details of which can be seen with reference to the following description and drawings.

DETAILED DESCRIPTION

Various aspects and examples of an instant messaging application having a file sending capability, as well as related systems and methods, are described below and illustrated in the associated drawings. Unless otherwise specified, applications in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"Processing logic" means any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

Examples, Components, and Alternatives

The following describes selected aspects of exemplary instant messaging applications and methods, as well as related systems and/or methods. The examples are intended for illustration and should not be interpreted as limiting the scope of the present disclosure. The following clearly and completely describes the technical solutions in the embodiments of this application with reference to the accompanying drawings in the embodiments of this application. Various illustrative embodiments of this application are specifically described. Other embodiments obtained by a person of ordinary skill in the art based on the embodiments of this application without creative efforts shall fall within the scope of this application.

Illustrative methods are described below. Where appropriate, reference may be made to components and systems that may be used in carrying out each step. These references are for illustration, and are not intended to limit the possible ways of carrying out any particular step of the method. Flowcharts are provided, illustrating steps performed in various illustrative methods, each of which may not recite the complete process or all steps of the respective method. Although various steps are described and depicted, the steps need not necessarily all be performed, and in some cases may be performed simultaneously or in a different order than the order shown.

Figure 1:
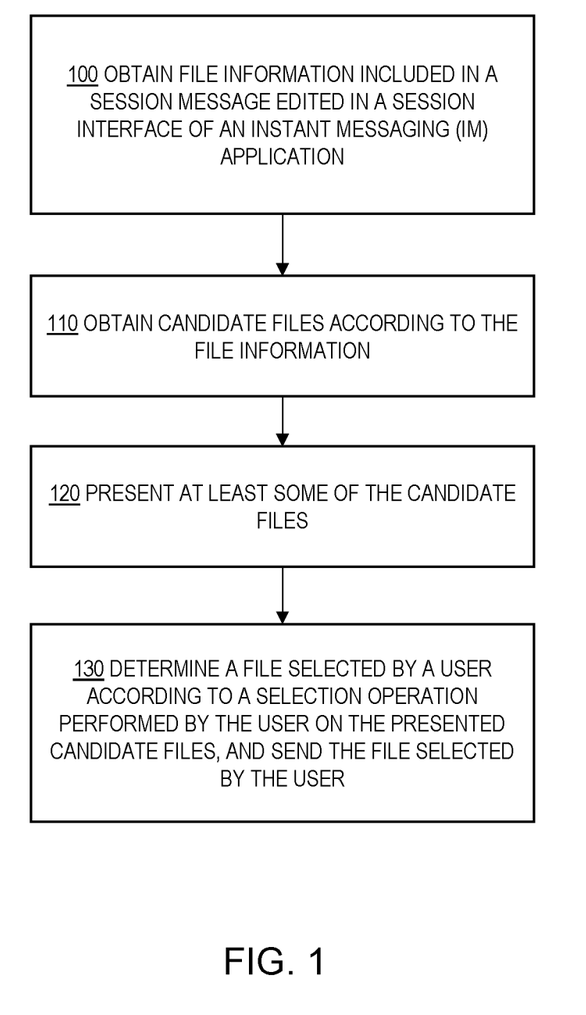
FIG. 1 is a schematic flowchart of a file sending method according to an embodiment of this application.

A file sending method in an instant messaging application disclosed according to an embodiment of this application may be applied to an electronic device. As shown in FIG. 1, the method may include step 100 to step 130.

Step 100: Obtain file information included in a session message edited in a session interface of an instant messaging application.

In the instant messaging application, a session participant may be referred to as a session object. A party of the session object edits the session message in the session interface through an editor. The session message may be a string-type message, a picture-type message, a video-type message, a voice-type message, or the like.

The instant messaging application may obtain, by invoking an interface provided by a system, the session message input into the editor. For example, the session message obtained by the instant messaging application may be in a type of a character string. The instant messaging application may identify the obtained session message in real time, to identify whether the session message includes a preset character. For example, it may be identified whether the session message includes "#?#", where "?" may represent any quantity of characters.

Alternatively, after entering the session message, a user clicks a sending icon, to send the session message to an opposite-party session object through a server. The server is a server of an instant messaging application, configured to manage the instant messaging application. After detecting that the sending icon is pressed, the instant messaging application may obtain, by invoking the interface provided by the system, the session message output by the editor. For example, the session message obtained by the instant messaging application may be in a type of a character string.

The instant messaging application may further identify characters in the obtained session message output by the editor, to identify whether a preset character is included therein. For example, it may be identified whether the session message includes "#?#", where "?" represents any quantity of characters. The instant messaging application may identify, through a regular expression or by invoking a character matching function, whether the session message includes "#?#". When it is identified that the session message includes "#?#", "?" is the file information. For example, after it is identified that the session message includes "#financial statements#", it is determined that the "financial statements" is the file information.

The preset character in the session message may be represented in the following format: a first preset character+ the file information+a second preset character. The first preset character and the second preset character may be characters that are not defined as having special meanings, such as #, ", and &. The first preset character and the second preset character may be the same or different. The file information may include a file name, an author, a modification date, a generation date, or the like. For example, the session message including the file information may be: #Li Bai#, #financial statements#, "labor contract".

Alternatively, the user may input a session message in the session interface through voice, and the session message obtained by the instant messaging application is a voice message. In this case, before the preset character included in the session message edited in the session interface of the instant messaging application is identified, the following may further be included: if the session message edited in the session interface of the instant messaging application is a voice message, converting the voice message into a text message. Subsequently, the preset character included in the text message is identified. For example, if the user inputs a voice message "search for a file 'financial statements'", the instant messaging application converts the voice message into a text message. An identified character string "search for a file 'financial statements'" includes preset characters "search for a file". In this case, "financial statements" is determined as the file information.

Step 110. Obtain candidate files according to the file information.

After obtaining the file information, the local electronic device may obtain candidate files or the electronic device obtains candidate files through a server. The file information may include a file name, an author, a modification date, a generation date, or the like. For example, the file information is a file name. The local electronic device searches for, by invoking the interface provided by the system, locally stored files whose file names include the file information, and uses the found files as the candidate files.

Alternatively, for example, the file information is still a file name. The electronic device may send a file search request to the server, where the file search request may include the file information. After receiving the file search request, the server may search the server locally and/or a third-party database for files whose file names include the file information as candidate files, and generate a file list including the candidate files according to the determined one or more candidate files. Subsequently, the server may feed back, in a JavaScript object notation (JSON) data format, a list of the found files to the electronic device that sends the file search request, for parsing and presentation by the electronic device. The file list may include file information of the found candidate files, for example, file names. The user may view file information of any candidate file in the file list, to determine whether the candidate file is a file that should be sent.

If the file information is an author, only an author attribute of a file may be matched when the file is being searched for. If the file information is a modification date, only a modification date attribute of a file may be matched when the file is being searched for. If the file information is a generation date, only a generation date attribute of a file may be matched when the file is being searched for.

For an electronic device or a server with a high computing capability, the file information may be alternatively contents of a file. If the file information is contents of a file, a file name and a file body may be matched when the file is being searched for.

When the file information includes multiple pieces of file information, for example, includes a file name and an author, matching may be separately performed for each piece of file information when the file is being searched for, to find a file matching all the multiple pieces of file information as a candidate file.

Step 120. Present at least some of the candidate files.

After obtaining the candidate files, the electronic device may present all or some of the candidate files, for a user to perform a selection and sending operation. For example, the electronic device may create a floating window in a current session interface area or an input method area by invoking the interface provided by the system, to display a list of the files. Due to a limitation of a display space, the electronic device may select, according to matching degrees between the found candidate files and the file information, some candidate files with higher matching degrees to be displayed in the floating window. Alternatively, the electronic device may create a list box in the floating window to display more candidate files, so that the user can browse more candidate files by turning pages or pulling a scroll bar. A person skilled in the art may further figure out, according to content disclosed in this application, other manners of presenting the candidate files, which are not specifically listed herein.

Step 130. Determine a file selected by a user according to a selection operation performed by the user on the presented candidate files, and send the file selected by the user.

The user performs a preset operation in a candidate file presentation interface, to select a to-be-sent candidate file. Then, the electronic device may determine the candidate file selected by the user, and send the candidate file selected by the user to the server. The server sends the candidate file selected by the user to a current session. For example, the user may select the to-be-sent candidate file by performing a preset operation such as clicking a file, sliding a file, or dragging a file.

The candidate file presentation interface may be the floating window shown in step 120, or may be another area in the session interface for displaying a file list. The sending the candidate file selected by the user to a current session includes: sending a file sending request to the server, where the file sending request includes an identifier of the candidate file selected by the user. The server receives the file sending request, generates a file sharing session message according to the identifier, and sends the file sharing session message to a session object included in the current session. An electronic device in which the session object is located may receive the session message, and present the session message in a session interface. When triggering the session message, the session object may obtain file information included in the session message, and send a file access request including the file information to the server, so that the server obtains a file corresponding to the file information, and presents the file to the user. Alternatively, the server receives the file sending request, reads the file corresponding to the identifier, and sends the file to a session object included in the current session. In this way, an electronic device in which the session object is located may receive the file, and present the file in the session interface, and the session object may view content in the file.

The electronic device obtains the file information included in the session message edited in the session interface of the instant messaging application, obtains the candidate files according to the file information, presents the at least some of the candidate files, determines the file selected by the user according to the selection operation performed by the user on the presented candidate files, and sends the file selected by the user. In this way, file sending efficiency of the instant messaging application can be effectively improved. A matching file is automatically searched for according to file information entered by a user and is presented to the user for selection, so that the user does not need to browse file storage directories level by level, thereby effectively improving file sending efficiency.

Figure 2:
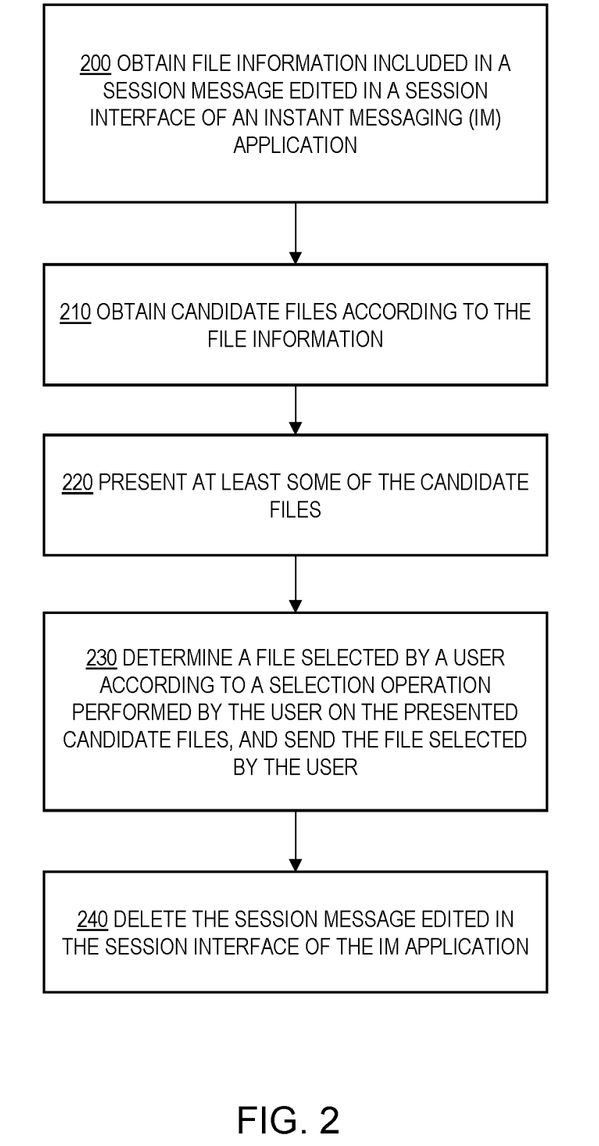
FIG. 2 is a schematic flowchart of a file sending method according to another embodiment of this application.

A file sending method in an instant messaging application disclosed in another embodiment of this application may be applied to an electronic device. As shown in FIG. 2, the method may include step 200 to step 240.

Step 200. Obtain file information included in a session message edited in a session interface of the instant messaging application.

The obtaining file information included in a session message edited in a session interface of the instant messaging application may include: identifying a preset character included in the session message edited in the session interface of the instant messaging application; and determining the file information identified by the preset character. For example, the file information may include any one or more of a file name, an author, a generation date, and a modification date.

When a user enters a session message including a preset character in the session interface by using an editor, a format of the session message may be shown as follows: a first preset character+the file information+a second preset character. The first preset character and the second preset character may be characters that are not defined as having special meanings, such as #, ", and &. The first preset character and the second preset character may be the same or different. For example, the session message entered by the user may be #financial statements#, where the file information may represent a file name. After editing the session message, the user clicks "send", and the electronic device may obtain the session message output by the editor, and identify the session message, to identify whether the session message includes the first preset character and the second preset character. If the session message includes the first preset character and the second preset character, it is determined that the session message is a file search message, instead of a common session message. Then, the electronic device may further determine characters between the first preset character and the second preset character as the file information. For example, if the session message entered by the user is #financial statements#, it may be determined that the file information is "financial statements".

For example, the electronic device may identify, by using a regular expression or by invoking a character match function, whether the session message includes a preset character, for example, "#?#". When it is identified that the session message includes "#?#", "?" is the file information. For example, after it is identified that the session message includes "#financial statements#", it may be determined that the "financial statements" is the file information.

The user may alternatively input a session message in the session interface through voice. In this case, before the preset character included in the session message edited in the session interface of the instant messaging application is identified, the following may further be included: if the session message edited in the session interface of the instant messaging application is a voice message, converting the voice message into a text message.

After detecting that the voice is input, the electronic device may obtain the voice message input by the user, convert the voice message into a text message, then identify a preset character included in the text message, and further determine file information in the text message.

Step 210. Obtain candidate files according to the file information.

For a specific implementation of obtaining candidate files according to the file information, refer to the foregoing embodiment. Details are not described herein again.

Step 220. Present at least some of the candidate files.

Figure 3:
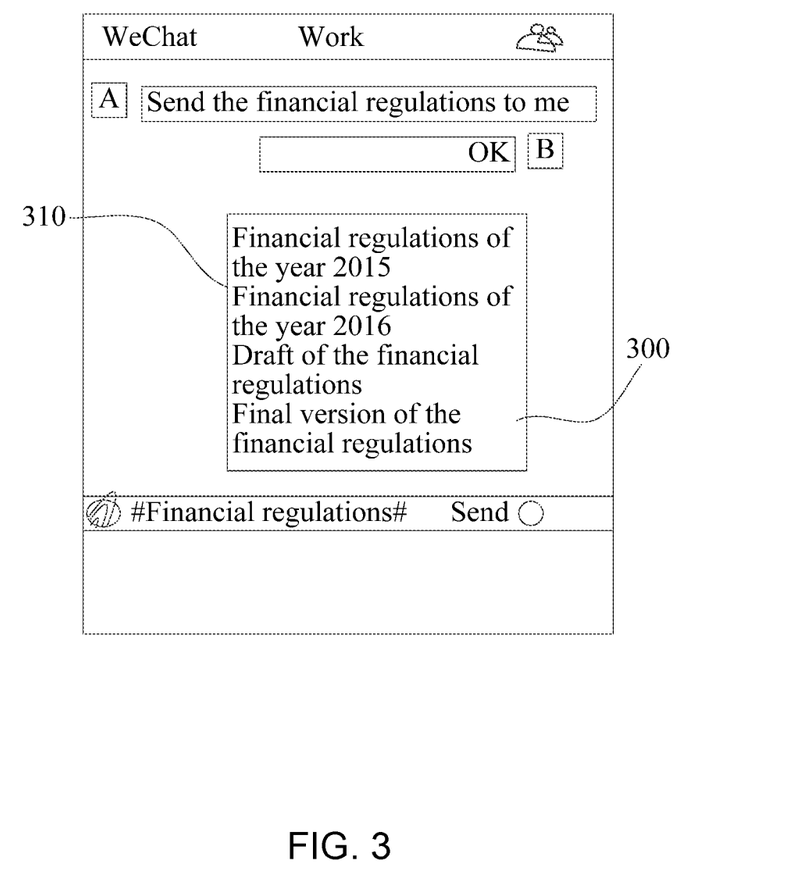
FIG. 3 is a schematic diagram of an interface for presenting a candidate file in a file sending method according to an embodiment of this application.

After obtaining the candidate files, the electronic device may present all or some of the candidate files, to be selected by a user for sending. For example, the presenting at least some of the candidate files may include: presenting file names of the obtained at least some of the candidate files in a list form. As shown in FIG. 3, the electronic device may create a floating window 300 in a current session interface area or an input method area by invoking an interface provided by a system, and then display a list 310 of the files in the floating window 300. Due to a limitation of a display space, the electronic device may select, according to matching degrees between the found candidate files and the file information, some candidate files with higher matching degrees to be displayed in the floating window, and only file names are displayed. During presentation of the candidate files, information such as the file names and version numbers of the obtained candidate files may be alternatively presented in a list form.

When the file information is an author, during presentation of the candidate files, the file names and author information of the obtained candidate files may be alternatively presented in a list form. When the file information is a modification date, during presentation of the candidate files, the file names of the candidate files matching modification dates, or the file names and modification dates may be alternatively presented in a list form. When the file information is a generation date, during presentation of the candidate files, the file names of the candidate files matching generation dates, or the file names and generation dates may be alternatively presented in a list form.

Step 230. Determine a file selected by a user according to a selection operation performed by the user on the presented candidate files, and send the file selected by the user.

The user may perform a preset operation in a candidate file presentation interface, to select a to-be-sent candidate file. Then, the electronic device may determine the candidate file selected by the user, and send the candidate file selected by the user to a server. The server sends the received candidate file to a current session. The determining a file selected by a user according to a selection operation performed by the user on the presented candidate files, and sending the file selected by the user may include: obtaining the selection operation performed by the user on the presented candidate files; and sending the candidate files corresponding to the selection operation. The selection operation may be any one of the following: clicking a file, sliding a file, and dragging a file.

For example, the selection operation is "clicking a file". When the user clicks a file presented in the floating window, the floating window receives a click event, and the electronic device may obtain the click event by invoking a system interface. Then, a candidate file corresponding to the click event is determined through message processing. If the candidate file clicked by the user is a file locally stored in the electronic device, the electronic device may send a file sending message to the server, so that the server sends the file to a current session. Correspondingly, another session object of the current session receives a file sharing session message. For a specific technical solution in which the electronic device sends a file sending message to the server, refer to any related art well-known by a person skilled in the art. Details are not described herein again.

If the candidate file clicked by the user is a file stored at an end of the server or a file found by the server by invoking a third-party database, the electronic device may send a file sending request to the server by invoking an HTTP protocol, where the file sending request may include an identifier of the candidate file, for example, a file name and a storage address, so that the server sends the file to the current session after reading the file locally or from the third-party database. For a specific technical solution in which the server sends the file to a session of the instant messaging application, refer to any related art well-known by a person skilled in the art. Details are not described herein again.

The user may alternatively select a file by sliding a file or dragging a file. For example, the user slides a file in a presented file list rightward, or drags a file in a file list to a session area.

Step 240. Delete the session message edited in the session interface of the instant messaging application.

After the electronic device sends the file sending session message to the server, because the session message input by the user is converted into the file sending message, the session message may be deleted from the session interface of the instant messaging application, to ensure that the electronic device no longer continues to send the session message.

The electronic device obtains the file information included in the session message edited in the session interface of the instant messaging application, obtains the candidate files according to the file information, presents the at least some of the candidate files, determines the file selected by the user according to the selection operation performed by the user on the presented candidate files, and sends the file selected by the user. In this way, file sending efficiency can be effectively improved. A matching file is automatically searched for according to file information entered by a user and is presented to the user for selection, so that the user does not need to browse file storage directories level by level, thereby effectively improving file sending efficiency. In addition, after being converted into a text message, the session message is automatically deleted, without needing to be manually deleted by the user, so that user operations are simplified, and repeated sending of the session message is avoided, thereby improving flexibility.

Figure 4:
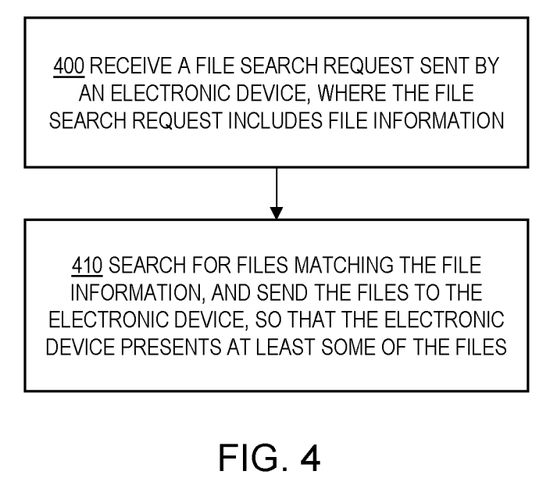
FIG. 4 is a schematic flowchart of a file sending method according to still another embodiment of this application.

A file sending method in an instant messaging application disclosed according to another embodiment of this application may be applied to a server. As shown in FIG. 4, the method may include step 400 and step 410.

Step 400. Receive a file search request sent by an electronic device, where the file search request includes file information.

The server may receive in real time the file search request sent by the electronic device. For example, the file information is a file name. The instant messaging application sends the file search request to the server, where the file search request may include the file name.

Step 410. Search for files matching the file information, and send the files to the electronic device, so that the electronic device presents at least some of the files.

After receiving the file search request sent by the electronic device, the server may search the server locally and/or a third-party database for files whose file names include the file information as candidate files, and generate a file list including the candidate files according to the determined one or more candidate files. Subsequently, the server may feed back, in a JSON data format, a list of the found files to the electronic device that sends the file search request, for parsing and presentation by the electronic device. The file list may include file information of the found candidate files, for example, file names. The user may view file information of any candidate file in the file list, to determine whether the candidate file is a file that should be sent.

The method may further include: receiving a file sending request sent by the electronic device, where the file sending request includes file information of a file to be sent by the electronic device in the instant messaging application and a destination electronic device that is to receive the file.

In a process in which the electronic device presents at least some of the candidate files, the user may select, by using a selection operation such as clicking a file, sliding a file, or dragging a file, a file to be sent to an opposite session party. After the user selects a candidate file or some candidate files for presentation, the electronic device may send a file sending request to the server.

The session interface includes multiple session objects of a current session. All the multiple session objects are destination session objects that are to receive the file. Electronic devices corresponding to the multiple session objects are destination electronic devices that are to receive the file. The file sending request carries the electronic devices corresponding to the multiple session objects, so that the server can learn of the destination electronic devices that are to receive the file.

The server may receive in real time the file sending request sent by the electronic device. The file sending request may include file information of a file to be sent by the electronic device in the instant messaging application and a destination electronic device that is to receive the file.

The method may further include: sending the file corresponding to the file information included in the file sending request to the destination electronic device.

The server determines the corresponding file according to the file information included in the file sending request, and sends the file to the destination electronic device included in the file sending request.

The server receives the file search request, searches for the candidate files matching the file information included in the file search request, and sends the candidate files to the electronic device sending the file search request, so that the electronic device presents the at least some of the candidate files, and a file can be rapidly sent to an electronic device of the opposite session party according to a selection of the user, thereby effectively improving file sending efficiency of the instant messaging application.

Figure 5:
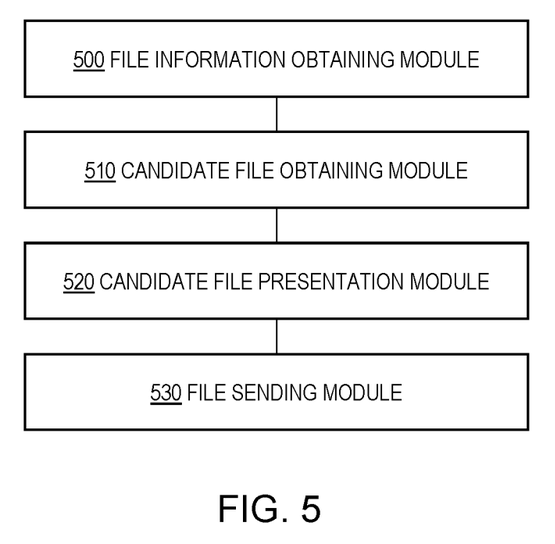
FIG. 5 is a schematic structural diagram of a file sending apparatus according to an embodiment of this application.

A file sending apparatus disclosed according to an embodiment of this application may be applied to an electronic device. As shown in FIG. 5, the apparatus may include a file information obtaining module 500, a candidate file obtaining module 510, a candidate file presentation module 520, and a file sending module 530.

The file information obtaining module 500 may be configured to obtain file information included in a session message edited in a session interface of the instant messaging application. The candidate file obtaining module 510 may be configured to obtain candidate files according to the file information obtained by the file information obtaining module 500. The candidate file presentation module 520 may be configured to present at least some of the candidate files. The file sending module 530 may be configured to: determine a file selected by a user according to a selection operation performed by the user on the candidate files presented by the candidate file presentation module 520, and send the file selected by the user.

Figure 6:
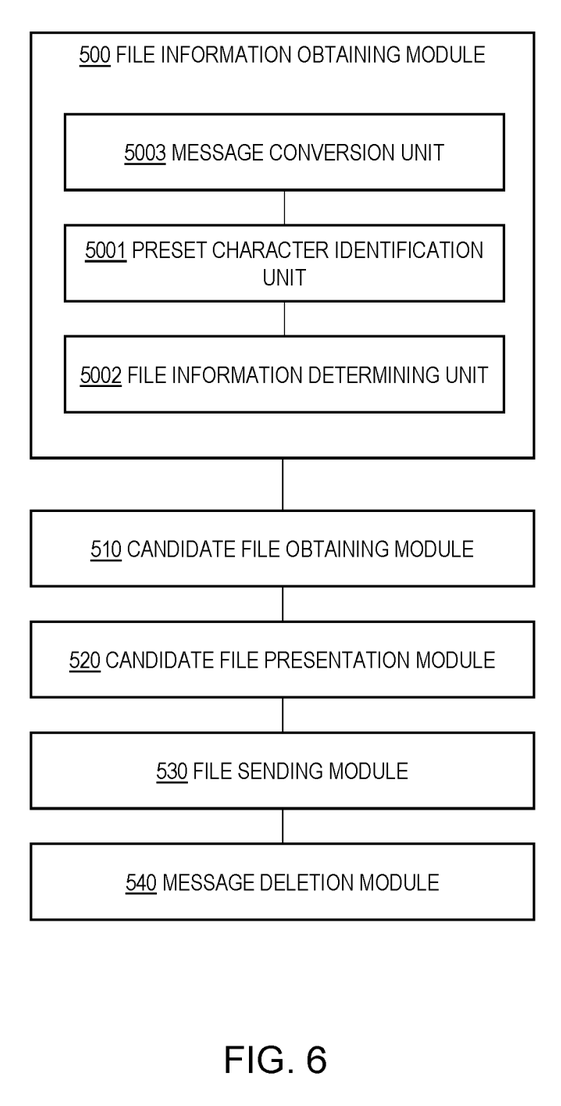
FIG. 6 is a schematic structural diagram of a file sending apparatus according to another embodiment of this application.

According to an example, as shown in FIG. 6, the file information obtaining module 500 may specifically include a preset character identification unit 5001 and a file information determining unit 5002. The preset character identification unit 5001 may be configured to identify a preset character included in the session message edited in the session interface of the instant messaging application. The file information determining unit 5002 may be configured to determine the file information identified by the preset character.

For example, the preset character in the session message may be represented in the following format: a first preset character+the file information+a second preset character. The first preset character and the second preset character may be characters that are not defined as having special meanings, such as #, ", and &. The first preset character and the second preset character may be the same or different. The file information may include a file name, an author, a modification date, a generation date, or the like. For example, the session message including file information is: #Libai#, #financial statements#, "labor contract".

The preset character identification unit 5001 may identify, by using a regular expression or by invoking a character matching function, whether the session message includes "#?#". When the preset character identification unit 5001 identifies that the session message includes "#?#", the file information determining unit 5002 may determine that "?" is the file information. For example, after the preset character identification unit 5001 identifies that the session message includes "#financial statements#", the file information determining unit 5002 may determine that "financial statements" is the file information.

According to another example, as shown in FIG. 6, the file information obtaining module 500 may further include a message conversion unit 5003, configured to: if the session message edited in the session interface of the instant messaging application is a voice message, convert the voice message into a text message.

The user may input a session message in the session interface through voice. In this case, after detecting that the voice is input, the message conversion unit 5003 may obtain the voice message input by the user, and converts the voice message into a text message. Then, the preset character identification unit 5001 may identify a preset character included in the text session message, and the file information determining unit 5002 may further determine file information in the text message.

The file information may include any one or more of a file name, an author, a generation date, and a modification date.

In addition, the candidate file presentation module 520 may be specifically configured to present file names of the obtained at least some of the candidate files in a list form.

The selection operation includes any one of the following: clicking a file, sliding a file, and dragging a file.

The file sending module 530 may be specifically configured to: obtain the selection operation performed by the user on the candidate files; and determine and send the candidate files corresponding to the selection operation.

According to still another example, as shown in FIG. 6, the apparatus may further include a message deletion module 540, configured to: after the file sending module 530 sends the file, delete the session message edited in the session interface of the instant messaging application.

The electronic device obtains the file information included in the session message edited in the session interface of the instant messaging application, obtains the candidate files according to the file information, then presents the at least some of the candidate files, determines the file selected by the user according to the selection operation performed by the user on the presented candidate files, and sends the file selected by the user. In this way, file sending efficiency in an instant messaging application can be effectively improved. A matching file is automatically searched for according to file information entered by a user and is presented to the user for selection, so that the user does not need to browse file storage directories level by level, thereby effectively improving file sending efficiency.

Figure 7:
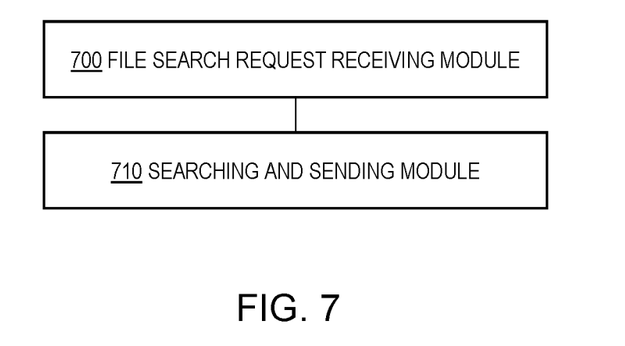
FIG. 7 is a schematic structural diagram of a file sending apparatus according to still another embodiment of this application.

A file sending apparatus disclosed according to an embodiment of this application may be applied to a server. As shown in FIG. 7, the apparatus may include a file search request receiving module 700 and a searching and sending module 710.

The file search request receiving module 700 may be configured to receive a file search request sent by an electronic device, where the file search request may include file information. The searching and sending module 710 may be configured to: search for candidate files matching the file information included in the file search request, and send the candidate files to the electronic device sending the file search request, so that the electronic device presents at least some of the candidate files.

Figure 8:
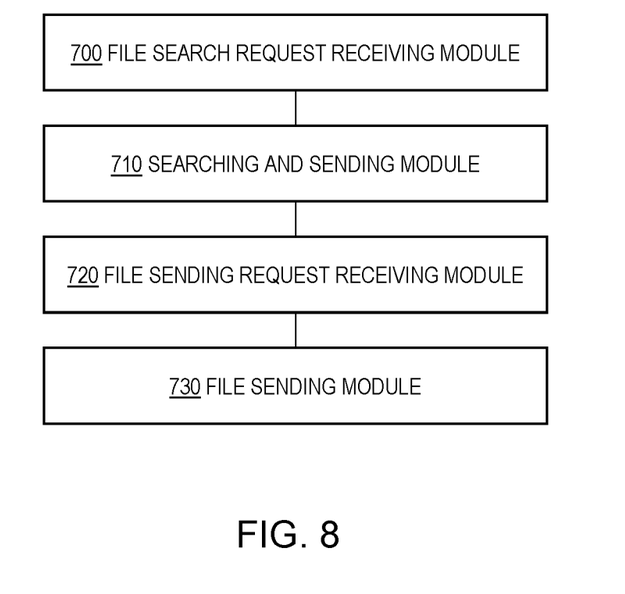
FIG. 8 is a schematic structural diagram of a file sending apparatus according to still another embodiment of this application.

As shown in FIG. 8, the apparatus may further include a file sending request receiving module 720, configured to receive a file sending request. The file sending request may include file information of a file to be sent by the electronic device in the instant messaging application and a destination electronic device that is to receive the file.

As shown in FIG. 8, the apparatus may further include a file sending module 730, configured to send the file corresponding to the file information included in the file sending request to the destination electronic device.

The server receives the file search request, searches for the candidate files matching the file information included in the file search request, and sends the candidate files to the electronic device sending the file search request, so that the electronic device presents the at least some of the candidate files, and a file can be rapidly sent to an electronic device of the opposite session party according to a selection of the user, thereby effectively improving file sending efficiency of the instant messaging application.

Correspondingly, this application further discloses an electronic device, and the electronic device may be a PC, a mobile terminal, a personal digital assistant, a tablet computer, or the like. The electronic device includes a memory, a processor, and a computer program stored in the memory and executable by the processor, where when executing the computer program, the processor implements the following operations: obtaining file information included in a session message edited in a session interface of an instant messaging application; obtaining candidate files according to the file information; presenting at least some of the candidate files; and determining a file selected by a user according to a selection operation performed by the user on the presented candidate files, and sending the file selected by the user.

According to an example, when executing the computer program, the processor implements the following operations: identifying a preset character included in the session message edited in the session interface of the instant messaging application; and determining the file information identified by the preset character.

According to an example, when executing the computer program, the processor implements the following operation: if the session message edited in the session interface of the instant messaging application is a voice message, converting the voice message into a text message.

According to an example, the file information includes any one or more of a file name, an author, a generation date, and a modification date.

According to an example, when executing the computer program, the processor implements the following operation: presenting file names of the obtained at least some of the candidate files in a list form.

According to an example, the selection operation includes any one of the following: clicking a file, sliding a file, and dragging a file.

According to an example, when executing the computer program, the processor implements the following operation: deleting the session message edited in the session interface of the instant messaging application after sending the file selected by the user.

Correspondingly, this application further discloses a server, including a memory, a processor, and a computer program stored in the memory and executable by the processor, where when executing the computer program, the processor implements the following operations: receiving a file search request sent by an electronic device, where the file search request includes file information; searching for candidate files matching the file information; and sending the candidate files to the electronic device, to present at least some of the candidate files on the electronic device.

According to an example, when executing the computer program, the processor implements the following operations: receiving a file sending request sent by the electronic device, where the file sending request includes file information of a file to be sent by the electronic device in the instant messaging application and a destination electronic device that is to receive the file; and sending the file corresponding to the file information to the destination electronic device.

This application further discloses a computer-readable storage medium, storing a computer program, where when executed by a processor, the program implements the steps of the file sending method in an instant messaging application shown in FIG. 1 and FIG. 2.

This application further discloses a computer-readable storage medium, storing a computer program, where when executed by a processor, the program implements the steps of the file sending method in an instant messaging application shown in FIG. 4.

The embodiments in this specification are all described in a progressive manner. Description of each of the embodiments focuses on differences from other embodiments. The embodiments are cross-referenced for the same or similar parts among the embodiments. An apparatus embodiment is basically similar to a method embodiment, and therefore is described briefly. For related parts, refer to partial descriptions in the method embodiment.

The file sending method in an instant messaging application, the apparatus, and the electronic device provided in this application are described in detail above. Specific examples are used in this specification to elaborate the principle and implementations of this application. The foregoing descriptions of the embodiments are only intended to help understand the method and core idea of this application. In addition, for a person of ordinary skill in the art, changes can be made on the specific implementations and application range according to the idea of this application. In conclusion, the content of this specification should not be construed as a limitation on this application.

Through description of the foregoing implementations, a person skilled in the art can clearly learn that each imple-mentation can be implemented by means of software in combination with a necessary universal hardware platform, and certainly, can be also implemented by using hardware. Based on such an understanding, the foregoing technical solutions essentially, or the part contributing to the prior art may be implemented in a form of a software product. The computer software product may be stored in a computer-readable medium, such as a ROM/RAM, a magnetic disk, or an optical disc, and includes several instructions for instructing a computer device (which may be a personal computer, a server, or a network device) to perform the methods described in the embodiments or some parts of the embodiments.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A file sending method in an instant messaging application, the method comprising:
   identifying, by an electronic device, a first preset character and a second preset character comprised in a session message edited in a session interface of the instant messaging application;
   determining, by the electronic device, characters between the first preset character and the second preset character as file information;
   obtaining, by the electronic device, candidate files according to the file information;
   presenting, by the electronic device, at least some of the candidate files;
   determining, by the electronic device, a file selected by a user according to a selection operation performed by the user on the presented candidate files;
   upon the determining the file selected by the user, sending the file selected by the user without sending the edited session message; and
   deleting, by the electronic device, the session message edited in the session interface of the instant messaging application after sending the file selected by the user without ever sending the edited session message.

2. The method according to claim 1, further comprising: if the session message edited in the session interface of the instant messaging application is a voice message, converting, by the electronic device, the voice message into a text message.

3. The method according to claim 1, wherein the file information comprises any one or more of a file name, an author, a generation date, and a modification date.

4. The method according to claim 1, wherein presenting at least some of the candidate files comprises:
   presenting, by the electronic device, file names of the at least some of the candidate files in a list form.

5. The method according to claim 1, wherein the selection operation comprises any one of the following: clicking a file, sliding a file, and dragging a file.

6. The method according to claim 1, wherein the first preset character and the second preset character are non-alphanumeric characters.

7. A file sending method in an instant messaging application, the method comprising:
   receiving, by a server, a file search request sent by an electronic device, wherein the file search request comprises file information, wherein the file information is determined by the electronic device by identifying a first preset character and a second preset cha racter comprised in a session message edited in a session interface of the instant messaging application, and by determining characters between the first preset character and the second preset character;
   searching for, by the server, candidate files matching the file information;
   sending, by the server, the candidate files to the electronic device, to present at least some of the candidate files on the electronic device;
   receiving, by the server, a file sending request sent by the electronic device, wherein the file sending request comprises a selected candidate file from the candidate files to be sent by the electronic device in the instant messaging application and a destination electronic device that is to receive the file; and
   sending, by the server, the file corresponding to the selected candidate file to the destination electronic device without sending the edited session message.

8. An electronic device, comprising:
   a memory, a processor, and a computer program stored in the memory and executable by the processor, wherein when executing the computer program, the processor implements the following operations:
      obtaining file information comprised in a session message edited in a session interface of an instant messaging application;
      obtaining candidate files according to the file information;
      presenting at least some of the candidate files;
      determining a file selected by a user according to a selection operation performed by the user on the presented candidate files;
      upon the determining the file selected by the user, sending the file selected by the user without sending the edited session message; and
      deleting the session message edited in the session interface of the instant messaging application after sending the file selected by the user without ever sending the edited session message;
   wherein obtaining the file information comprised in the session message edited in the session interface of the instant messaging application comprises:
      identifying a preset character comprised in the session message edited in the session interface of the instant messaging application, the preset character comprises a first preset character and a second preset character; and
      determining characters between the first preset character and the second preset character as the file information.

9. The electronic device according to claim 8, wherein when executing the computer program, the processor implements the following operation:
   if the session message edited in the session interface of the instant messaging application is a voice message, converting the voice message into a text message.

10. The electronic device according to claim 8, wherein the file information comprises any one or more of a file name, an author, a generation date, and a modification date.

11. The electronic device according to claim 8, wherein when executing the computer program, the processor implements the following operation:
   presenting file names of the at least some of the candidate files in a list form.

12. The method according to claim 6, wherein the first preset character and the second preset character are the same.

13. The method according to claim 6, wherein the first preset character and the second preset character are different.

* * * * *

UNITED STATES PATENT AND TRADEMARK OFFICE
CERTIFICATE OF CORRECTION

PATENT NO. : 11,019,012 B2  
APPLICATION NO. : 16/674567  
DATED : May 25, 2021  
INVENTOR(S) : Dongyuan Zhang Page 1 of 1

It is certified that error appears in the above-identified patent and that said Letters Patent is hereby corrected as shown below:

In the Claims

Claim 7:
Column 15, Line 17: the text "first preset character and a second preset cha racter" should read --first preset character and a second preset character--.

Signed and Sealed this
Tenth Day of August, 2021

Drew Hirshfeld
*Performing the Functions and Duties of the
Under Secretary of Commerce for Intellectual Property and
Director of the United States Patent and Trademark Office*